(12) United States Patent
Choi

(10) Patent No.: US 6,326,641 B1
(45) Date of Patent: Dec. 4, 2001

(54) LIQUID CRYSTAL DISPLAY DEVICE HAVING A HIGH APERTURE RATIO

(75) Inventor: Woong Sik Choi, Kyunggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/447,723

(22) Filed: Nov. 24, 1999

(30) Foreign Application Priority Data

Nov. 27, 1998 (KR) .................................................. 98-51186

(51) Int. Cl.⁷ .................................................. H01L 29/04
(52) U.S. Cl. ............................ 257/57; 257/59; 257/296; 349/38; 349/42; 349/43
(58) Field of Search ................................. 257/57, 59, 72, 257/296, 297; 349/42, 43, 46, 38

(56) References Cited

U.S. PATENT DOCUMENTS

| | | | |
|---|---|---|---|
| 5,757,444 | * 5/1998 | Takemura | 349/38 |
| 5,923,390 | * 7/1999 | Jung Mok et al. | 349/38 |
| 6,057,896 | * 5/2000 | Rho et al. | 349/42 |
| 6,115,088 | * 9/2000 | Zhang et al. | 349/39 |
| 6,172,728 | * 1/2001 | Hiraishi | 349/139 |

FOREIGN PATENT DOCUMENTS

404044014 * 2/1992 (JP) .

* cited by examiner

Primary Examiner—Nathan Flynn
Assistant Examiner—Remmon R. Fordé
(74) Attorney, Agent, or Firm—Long Aldridge & Norman LLP

(57) ABSTRACT

A liquid crystal display device includes first and second gate lines, first and second data lines intersecting said first and second gate lines, an insulating film covering said gate lines, and a pixel electrode overlapping the first and second gate lines and the first and second data lines in order to increase the aperture ratio. The storage capacitor has a first storage capacitor electrode which is a portion of the first gate line, a second storage capacitor electrode a width of which is substantially same as that of the gate lines, the insulating film between the first and second storage capacitor electrodes, and a protecting film having a contact hole on the second storage capacitor electrode. The pixel electrode contacts the second storage capacitor electrode through the contact hole of the protecting film.

10 Claims, 5 Drawing Sheets

LIQUID CRYSTAL DISPLAY DEVICE HAVING A HIGH APERTURE RATIO

This application claims the benefit of Korean Patent Application No. 98-51186, filed on Nov. 27, 1998, which is hereby incorporated by reference.

BACKGROUND OF THE INVENTION

1. Field of the Invention

The present invention relates to a liquid crystal display (LCD) device, and more particularly, to a thin film transistor liquid crystal display device having a high aperture ratio.

2. Discussion of the Related Art

An aperture ratio of a liquid crystal display device is a ratio of an area which a light penetrates with respect to an entire area of the pixel. Such a ratio is important for picture quality of the device.

One of the methods for increasing the aperture ratio is shown in FIG. 1, where a pixel electrode is enlarged over data lines and a black matrix is not necessary between the data lines and the pixel electrode.

FIG. 1 is a plan view of a pixel module 100 of a conventional liquid crystal display device. The module 100 is defined by gate lines 2 and 3 adapted for carrying gate drive signals to the pixel modules and data lines 16 and 18 adapted for delivering data signals to the pixel modules. The gate line 3 has a gate electrode 4, the data line 16 has a source electrode 6, and a pixel electrode 12 is connected to a drain electrode 8 of a thin film transistor (TFT) denoted by "T" through a contact hole 10. A storage capacitor for the device is denoted by "S".

As shown in FIG. 1, in order to increase the aperture ratio, the pixel electrode 12 overlaps the data lines 16 and 18, and there is no interval or space between the data lines and the pixel electrode 12. Thus, no opaque mask or black matrix for blocking side edges of the pixel module 100 is needed, which increases the aperture ratio of the LCD.

However, there is still an interval "L" between the gate line 3 and the pixel electrode 12, as shown in FIG. 2 which is a cross sectional view taken along the line II—II of FIG. 1. Thus, a black matrix (light shielding layer) for blocking the interval "L" is needed, which decreases the aperture ratio.

Overlapping the gate line 3 with the pixel electrode 12 in order to cover the interval "L", as shown in FIG. 3, causes increased parasitic capacitance (designated by the area "OL") between the pixel electrode 12 and gate line 3. Such parasitic capacitance may cause flicker.

FIG. 4 is a corresponding schematic circuit diagram of FIG. 3. The parasitic capacitance $C_{gp,i}$ between the overlapped portion of the pixel electrode 12 and the gate line 3 is connected to the liquid crystal capacitance $C_{LC,i}$. Thus, during the off-time of the TFT "T", the liquid crystal layer is influenced by the parasitic capacitance $C_{gp,i}$ which deteriorates the picture quality.

In FIG. 4, the symbols $V_{g,i}$ and $V_{D,i}$ designate voltages for the gate electrode and the data line, respectively.

SUMMARY OF THE INVENTION

Accordingly, the present invention is directed to a liquid crystal display device having a high aperture ratio that substantially obviates one or more of the problems due to limitations and disadvantages of the related art.

An object of the present invention is to provide an LCD having a high aperture ratio.

Another object of the present invention is to provide an LCD that can minimize reflection by data lines or black matrixes of color filters.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes an insulating substrate; first and second gate lines formed on the substrate; first and second data lines crossing the first and second gate lines so as to define a pixel region; an insulating film covering the gate lines; a pixel electrode disposed in the pixel region; a switching element disposed in the pixel region and connected between the second gate line and the pixel electrode; a storage capacitor having a first storage capacitor electrode that includes a portion of the first gate line, a second storage capacitor electrode having a width substantially the same as that of the gate lines, an insulating film between the first and second storage capacitor electrodes, and a protecting film having a contact hole on the second storage capacitor electrode; and wherein the pixel electrode overlaps the first and second gate lines on the protecting film and contacts the second storage capacitor electrode through the contact hole of the protecting film.

According to another aspect of the present invention, a liquid crystal display device comprises an insulating substrate; first and second gate lines on said substrate; first and second data lines crossing said first and second gate lines and defining a pixel region; an insulating film on said gate lines; a pixel electrode in said pixel region; a switching element in said pixel region and connected between one of the first and said second gate lines and said pixel electrode; a storage capacitor including a first storage capacitor electrode made of a portion of said first gate line, a second storage capacitor electrode having a width that is substantially same as that of said first gate line, the insulating film being between the first and second storage capacitor electrodes; and a protecting film having a contact hole on the second storage capacitor electrode; wherein said pixel electrode overlaps said first and second gate lines on the protecting film and contacts the second storage capacitor electrode through the contact hole of the protecting film.

According to a further aspect of the present invention, a method of making a liquid crystal display device having an insulating substrate comprises forming first and second gate lines on said substrate; forming first and second data lines crossing said first and second gate lines and defining a pixel region; forming an insulating film on said gate lines; forming a pixel electrode in said pixel region; forming a switching element in said pixel region and connected between one of the first and said second gate lines and said pixel electrode; forming a storage capacitor including a first storage capacitor electrode made of a portion of said first gate line, a second storage capacitor electrode having a width that is substantially same as that of said first gate line, the insulating film being between the first and second storage capacitor electrodes; and forming a protecting film having a contact hole on the second storage capacitor electrode; wherein said pixel electrode overlaps said first and second gate lines on the protecting film and contacts the second storage capacitor electrode through the contact hole of the protecting film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
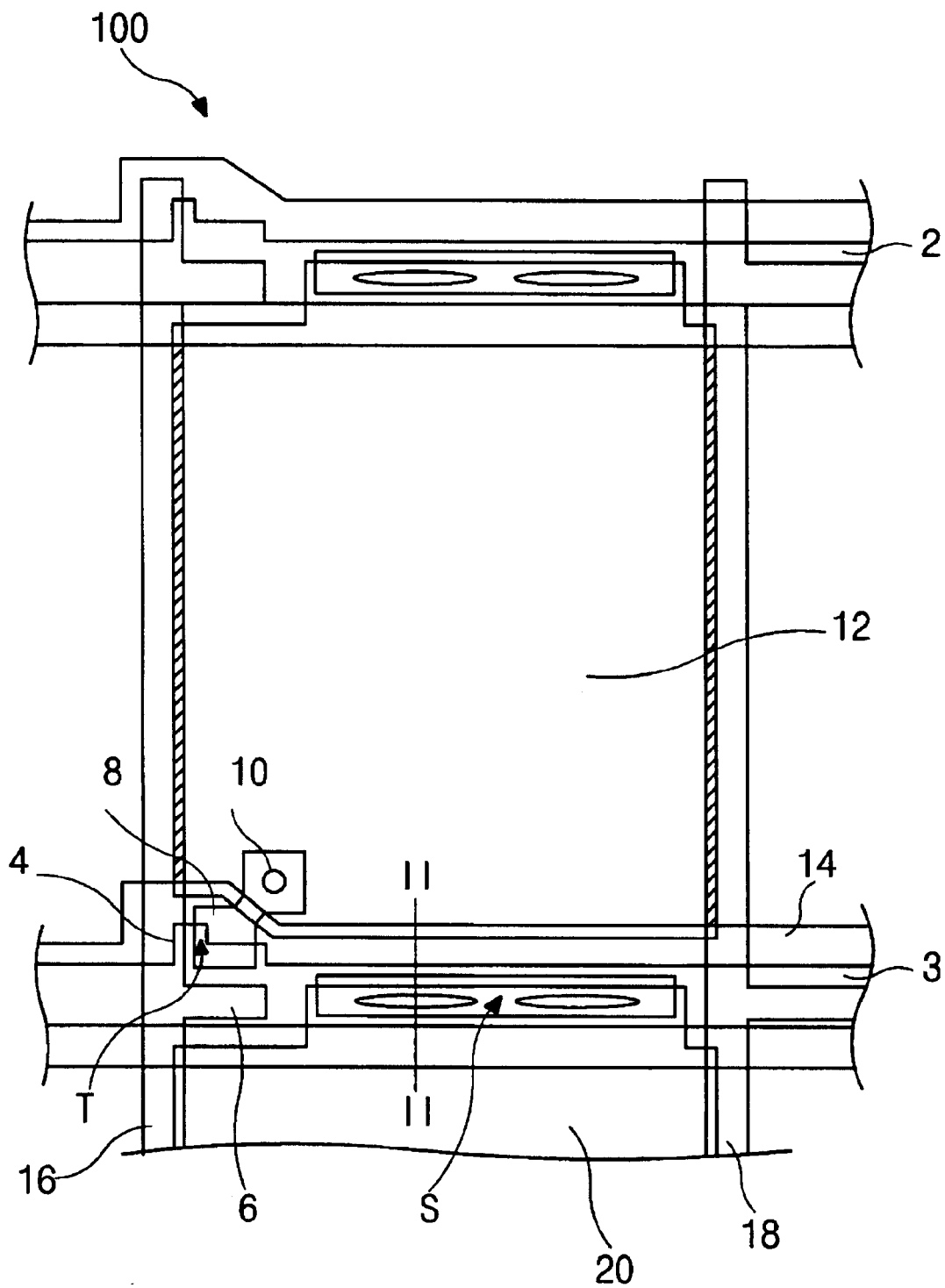
FIG. 1 is a plan view of an active matrix display device according to the prior art.
Figure 2:
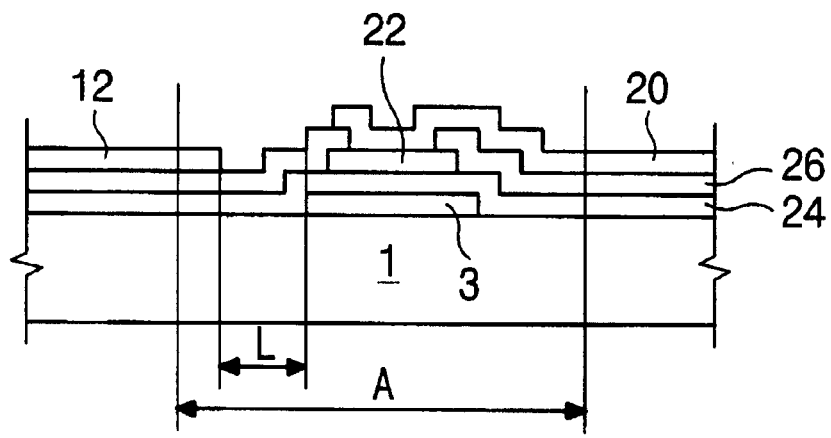
FIG. 2 is a sectional view of the active matrix display device taken along a line II—II of FIG. 1.
Figure 3:
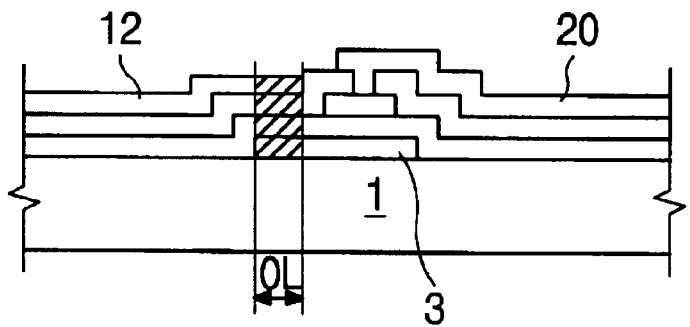
FIG. 3 is a view similar to FIG. 2, where no gap is shown between the pixel electrode and the gate lines.
Figure 4:
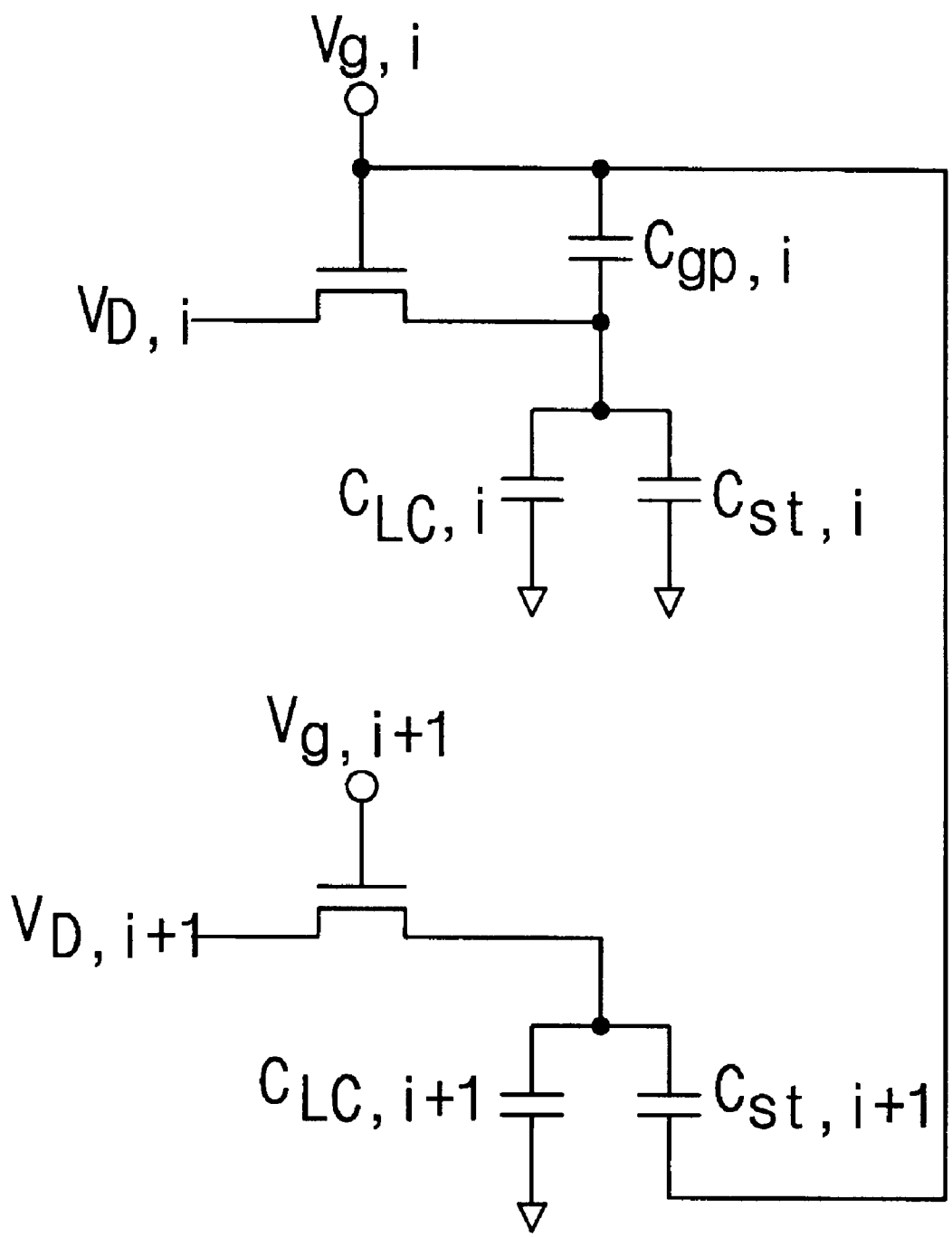
FIG. 4 is a schematic circuit diagram of the device of FIG. 3.
Figure 5:
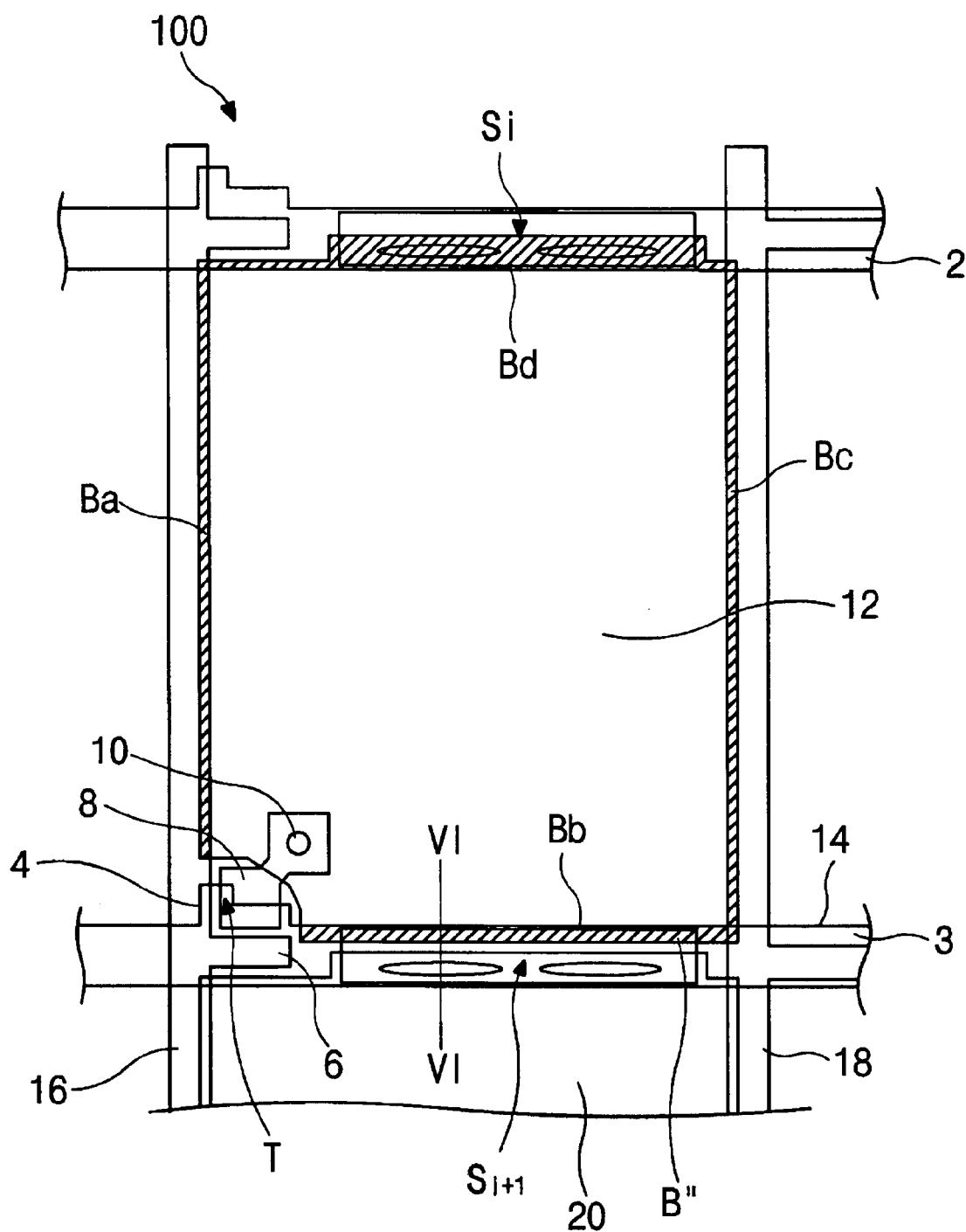
FIG. 5 is a plan view of an active matrix display device according to an embodiment of the present invention.

FIG. 5 shows a pixel of the active matrix LCD according to an embodiment of the present invention. A first data line 16 and a second data line 18 extend along a matrix column direction. In a matrix row direction, first and second gate lines 2 and 3 are shown. The two data lines 16 and 18 and the two gate lines 2 and 3 define a pixel region. The data line 16 (18) has a source electrode 6. The gate line 2 (3) has a gate electrode 4, which is preferably L-shaped to increase the aperture ratio. The pixel electrode 12 electrically contacts a drain electrode 8 through a contact hole 10 on the drain electrode 8.

The pixel electrode 12 overlaps the data lines 16 and 18 and the gate lines 2 and 3.

Due to the overlapped areas "Ba", "Bb", "Bc", and "Bd", there is no gap between the gate lines 2 and 3 and the pixel electrode 12. Thus, no black matrix is required therebetween. The overlapped area "Bd" also functions as a storage capacitor "S". The pixel electrode 12 is made of a transparent conductive material, for example, indium tin oxide (ITO).

Thus, the aperture ratio of the device of the present invention increases and a better picture can be displayed.

If the pixel electrode 12 is made of a non-transparent material, such as a reflective type LCD, the aperture ratio is also increased by the present invention. In this case, the pixel electrode or reflective electrode 12 can extend over the thin film transistor "T".

Figure 6:
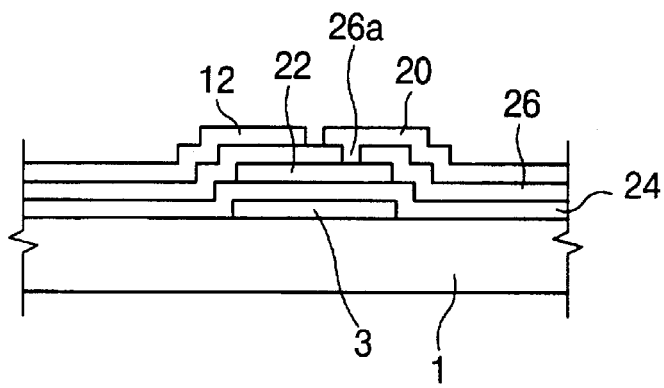
FIG. 6 is a sectional view of the active matrix display device taken along a line VI—VI of FIG. 5.

FIG. 6 is a sectional view of the storage capacitor "$S_{i+1}$" taken along a line VI—VI of FIG. 5. The storage capacitor "$S_{i+1}$" is formed on the substrate 1 and has a first storage capacitor electrode, which is a portion of the gate line 3, and a second storage capacitor electrode 22, which is electrically connected to adjacent pixel electrode 20. Between the first and second storage capacitor electrodes 3 and 22, an insulating film 24 is positioned. The second storage capacitor electrode 22 is preferably made of the same material as the drain/source electrode 6 (8). On the second electrode 22 and the insulating film 24, a protecting layer 26 is deposited. The protecting layer 26 has a contact hole 26a through which the pixel electrode 20 contacts the second storage capacitor electrode 22. The second storage capacitor electrode 22 has a substantially the same width as the gate line 2 (3). Thus, the electric field by the gate line 2 (3) is blocked by the second storage capacitor electrode 22. Therefore, the flicker by the cross-talk can be reduced.

Figure 7:
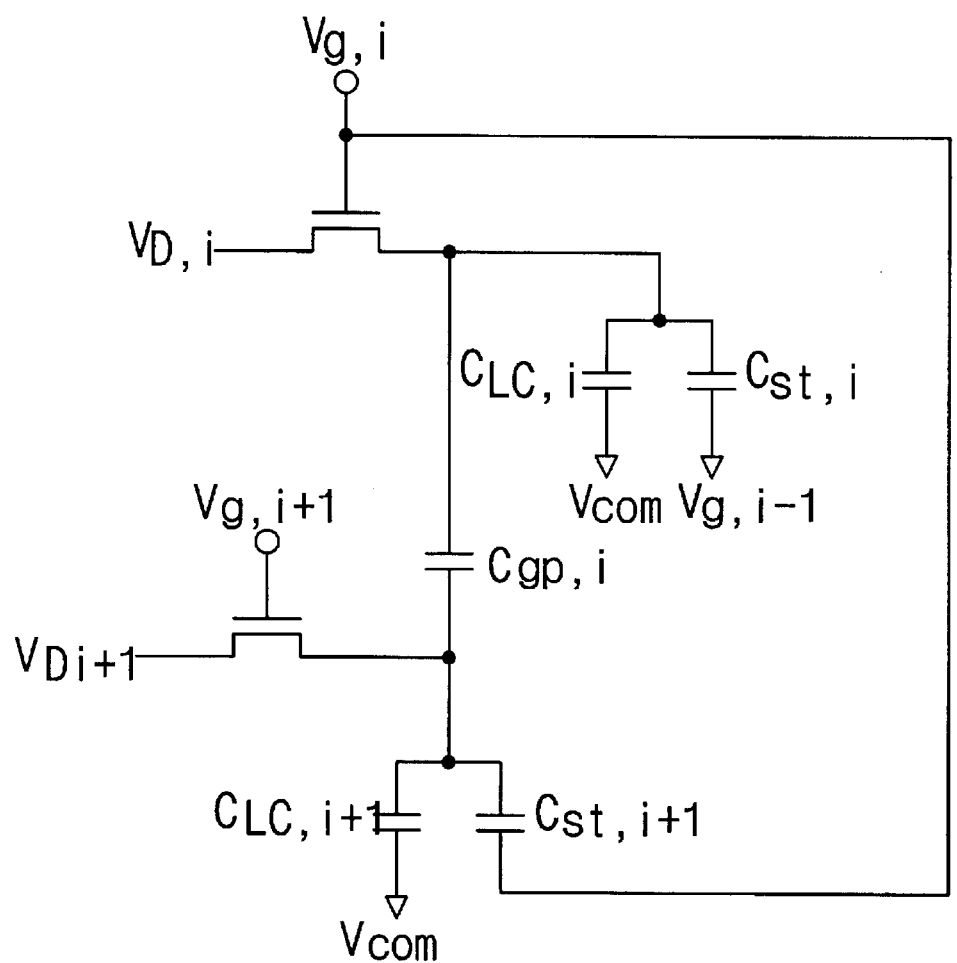
FIG. 7 is a schematic circuit diagram of the device of FIG. 5.

In order to explain the effect of the above embodiment, we refer to FIG. 7 which is a schematic circuit diagram of the device of FIG. 5.

The parasitic capacitance $C_{gp,i}$ between the gate line 3 (2) and the overlapped portion of the pixel electrode 12 is connected to the gate voltage $V_{g,i}$ through the capacitance $C_{st,i+1}$ of the storage capacitor "$S_{i+1}$" between the gate line 3 (2) and the adjacent pixel electrode 20. For an off state of the voltage $V_{g,i}$, the liquid crystal capacitance $C_{LC,i}$ in the liquid crystal layer is affected through the storage capacitance $C_{st,i+1}$. That is, for an off state of the gate voltage $V_{g,i}$, a voltage drop $V_p$ occurs owing to the liquid crystal capacitance $C_{LC,i}$, but the storage capacitance "$C_{st,i+1}$" is relatively much bigger than the parasitic capacitance $C_{gp,i}$, thus the effect of the parasitic capacitance $C_{gp,i}$ on the voltage drop $V_p$ can be reduced.

It will be apparent to those skilled in the art that various modifications and variation can be made in the liquid crystal display device having a high aperture ratio of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   an insulating substrate;
   first and second gate lines on said substrate;
   first and second data lines crossing said first and second gate lines and defining a pixel region;
   an insulating film on said gate lines;
   a pixel electrode in said pixel region;
   a switching element in said pixel region and connected between one of the first and said second gate lines and said pixel electrode;
   a storage capacitor including a first storage capacitor electrode made of a portion of said first gate line, a second storage capacitor electrode having a width that is substantially same as that of said first gate line, the insulating film being between the first and second storage capacitor electrodes; and
   a protecting film having a contact hole on the second storage capacitor electrode;
   wherein said pixel electrode overlaps said first and second gate lines on the protecting film and contacts the second storage capacitor electrode through the contact hole of the protecting film.

2. A liquid crystal display device according to claim 1, wherein said pixel electrode is made of substantially non-transparent material.

3. A liquid crystal display device according to claim 1, wherein said pixel electrode is made of substantially reflective material.

4. A liquid crystal display device according to claim 1, wherein said pixel electrode is made of a substantially transparent material.

5. A liquid crystal display device according to claim 1, wherein said pixel electrode overlaps said first and second data lines.

6. A liquid crystal display device according to claim 1, wherein said switching element is a thin film transistor.

7. A liquid crystal display device according to claim 1, wherein the pixel electrode overlaps at least a portion of the entire first and second gate lines except at an area of the switching element.

8. A liquid crystal display device according to claim 7, wherein the pixel electrode overlaps at least a portion of the entire first and second data lines except at an area of the switching element.

9. A liquid crystal display device according to claim 1, wherein the second storage electrode helps to reduce flicker.

10. A liquid crystal display device according to claim 9, wherein the second storage electrode blocks an electric field caused by at least one of the first and second gate lines.

* * * * *